United States Patent
Zeng et al.

(10) Patent No.: US 9,363,055 B2
(45) Date of Patent: Jun. 7, 2016

(54) METHOD AND APPARATUS FOR CONFIGURING A SOUNDING REFERENCE SIGNAL FOR A SEGMENT CARRIER

(71) Applicant: BROADCOM CORPORATION, Irvine, CA (US)

(72) Inventors: Erlin Zeng, Beijing (CN); Haiming Wang, Beijing (CN); Chunyan Gao, Beijing (CN); Wei Hong, Beijing (CN); Wei Bai, Beijing (CN); Jing Han, Beijing (CN); Gilles Charbit, Farnborough (GB)

(73) Assignee: BROADCOM CORPORATION, Irvine, CA (US)

( * ) Notice: Subject to any disclaimer, the term of this patent is extended or adjusted under 35 U.S.C. 154(b) by 139 days.

(21) Appl. No.: 14/080,278

(22) Filed: Nov. 14, 2013

(65) Prior Publication Data

US 2014/0071922 A1    Mar. 13, 2014

Related U.S. Application Data

(63) Continuation of application No. PCT/CN2011/074084, filed on May 16, 2011.

(51) Int. Cl.

| H04L 5/00 | (2006.01) |
|---|---|
| H04W 72/04 | (2009.01) |
| H04W 24/10 | (2009.01) |

(52) U.S. Cl.
CPC .............. *H04L 5/0048* (2013.01); *H04L 5/001* (2013.01); *H04W 72/0446* (2013.01); *H04L 5/0053* (2013.01); *H04L 5/0091* (2013.01); *H04L 5/0094* (2013.01); *H04W 24/10* (2013.01); *H04W 72/04* (2013.01)

(58) Field of Classification Search
CPC ..... H04L 5/001; H04L 5/0048; H04L 5/0053; H04L 5/0094; H04W 72/0446
See application file for complete search history.

(56) References Cited

U.S. PATENT DOCUMENTS

| 2012/0057559 A1* | 3/2012 | Ahn et al. ..................... 370/329 |
| 2012/0106495 A1* | 5/2012 | Yang et al. ................... 370/329 |
| 2014/0071922 A1* | 3/2014 | Zeng et al. .................... 370/329 |

FOREIGN PATENT DOCUMENTS

| CN | 101808409 A | 8/2010 |
| CN | 101917765 A | 12/2010 |
| WO | WO 2010107880 A2 | 9/2010 |

OTHER PUBLICATIONS

3GPP TS 36.211 v9.1.0, Technical Specification; $3^{rd}$ Generation Partnership Project; Technical Specification Group Radio Access Network; Evolved Universal Terrestrial Radio Access (E-UTRA); Physical Channels and Modulation (Release 9), Mar. 2010, (85 pages).
PCT international Search Report and Written Opinion Dec. 22, 2011 issued in a related PCT International Application No. PCT/CN2011/074084 (9 pages).

* cited by examiner

*Primary Examiner* — Raj Jain
(74) *Attorney, Agent, or Firm* — Foley & Lardner LLP; Christopher J. McKenna; Paul M. H. Pua

(57) ABSTRACT

Methods, apparatus and computer program products configure a sounding reference signal (SRS) for a segment carrier that serves as a contiguous bandwidth extension of a component carrier, such as a component carrier that is backwards compatible with prior releases of a mobile terminal. In the context of a mobile terminal, the method receives a triggering message that identifies respective configurations of the SRS for the component carrier and the associated segment carrier. The configuration of the SRS for the component carrier is different than the configuration of the SRS for the segment carrier. The method also causes the SRS to be transmitted in accordance with the respective configurations identified by the triggering message via uplink subframes of the component carrier and the segment carrier.

20 Claims, 6 Drawing Sheets

METHOD AND APPARATUS FOR CONFIGURING A SOUNDING REFERENCE SIGNAL FOR A SEGMENT CARRIER

CROSS REFERENCE TO RELATED APPLICATION

This application is a Continuation of PCT International Patent Application No. PCT/CN2011/074084 filed on May 16, 2011, the entire content of which is incorporated herein by reference.

FIELD OF THE INVENTION

Embodiments of the present invention relate generally to communications technology and, more particularly, to methods and apparatus for configuring and providing sounding reference signals.

BACKGROUND INFORMATION

Sounding reference signals (SRS) are transmitted on an uplink channel between a mobile terminal and a base station so as to allow the base station to estimate the quality of the uplink channel at different frequencies. Based upon the estimates of the quality of the uplink channel, the network may schedule uplink transmissions on resource blocks having good quality.

SRS are configured based upon a number of parameters. For example, the configuration of the SRS in LTE release 8 is described in the corresponding physical layer specification, that is, 3GPP TS 36.211. For example, the configuration of the SRS may be defined by parameters such as the cell-specific SRS bandwidth $C_{SRS}$, the mobile terminal-specific SRS bandwidth $B_{SRS}$, the mobile terminal-specific cyclic shift for SRS sequence $N_{SRS}^{cs}$, the mobile terminal-specific SRS transmission comb $k_{TC}$ and the SRS sequence length $M_{sc,b}^{rs}$. As defined by 3GPP TS 36.211, for example, $C_{SRS}$ may be an element of $\{0,1,2,3,4,5,6,7\}$, $B_{SRS}$ may be an element of $\{0,1,2,3\}$, $N_{SRS}^{cs}$ may equal 0,1,2,3,4,5,6 or 7, $k_{TC}$ may be an element of $\{0,1\}$ and $M_{sc,b}^{rs}$ may be set equal to $(m_{SRS,b} N_{xc}^{rb})/2$. Many of these parameters may be configured in a higher layer to be either cell-specific or mobile terminal-specific.

Based upon these parameters, a mobile terminal may determine the assigned SRS resource with the frequency starting point and the physical resources into which the CRS shall be mapped being a function of these parameters. For example, in an instance in which the uplink bandwidth $N_{ul}^{RB}$ is equal to or between 6 and 40, that is, $6 \leq N_{ul}^{RB} \leq 40$, $m_{SRS,b}$ and $N_b$ may be defined based upon the cell-specific SRS bandwidth and the mobile terminal-specific SRS bandwidth as follows for values at B=0,1,2 and 3:

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

These parameters, that is, $m_{SRS,b}$ and $N_b$, are defined, for example, by 3GPP TS 36.211, v9.0.0, section 5.5.3.2 with $m_{SRS,b}$ being a value that is utilized to calculate the actual bandwidth for the SRS signal in terms of the number of subcarriers and $N_b$ being a value that determines the number of possible SRS frequency domain starting positions exist for a given SRS transmission bandwidth $m_{SRS,b}$.

SRS resources may be arranged in a tree structure. For example, in releases 8, 9 and 10 of LTE, SRS resources are arranged in a tree structure as may be observed from the definition of the frequency starting position $k_0$ for a given set of SRS resources without SRS frequency hopping as follows:

$$k_0 = k_0' + \sum_{b=0}^{B_{SRS}} 2M_{sc,b}^{RS} n_b$$

where for normal uplink subframes $k_0' = (\lfloor N_{RB}^{UL}/2 \rfloor - m_{SRS,0}/2) N_{SC}^{RB} + k_{TC}$ In this context, a normal uplink subframe is an uplink subframe other than a special uplink subframe as described, for example, by 3GPP TS 36.211, v9.0.0, section 4.2.

By way of example, FIG. 1 illustrates the SRS resources of a mobile terminal in which the cell-specific SRS bandwidth is 36 physical resource blocks (PRBs). In this regard, the SRS resources of a mobile terminal are determined based on the cell-specific SRS bandwidth, the mobile terminal-specific SRS bandwidth and a frequency starting position, which may be a function of a mobile terminal-specific offset that is configured at a higher layer. In FIG. 1, for example, there are 1, 3 and 9 resources for SRS bandwidths of 36, 12 and 4 PRBs, respectively. In the example of FIG. 1, PRBs are also reserved at the opposite bandwidth edges, such as two PRBs being positioned at each bandwidth edge that may be used, for example, for physical uplink control channel (PUCCH) signaling.

In an instance involving carrier aggregation, SRS may be provided for a component carrier (CC). In this regard, carrier aggregation is a combination of two or more component carriers operating at different frequencies in order to provide a broader transmission bandwidth for a mobile terminal. The component carriers aggregated in accordance with carrier aggregation may include a primary component carrier and one or more secondary component carriers. The primary component carrier may be that which: (i) operates on a primary carrier in which the mobile terminal either performs the initial connection establishment procedure or initiates the connection re-establishment procedure, or (ii) was indicated as a primary component carrier in a handover procedure. Conversely, a secondary component carrier, operating on a secondary carrier, may be that which is configured once radio resource control (RRC) is established and which may be used to provide additional radio resources.

At least some component carriers may be backwards compatible. For example, a backwards compatible component carrier of release 10 or 11 of LTE has the same bandwidth, such as 5 MHz, as the component carriers of a prior version, such as releases 8 or 9 of LTE. In some instances, however, the bandwidth that is required for transmission does not closely match the bandwidth of the backwards compatible component carrier. For example, the bandwidth that is required for transmission may be slightly larger than the bandwidth of the backwards compatible component carrier. While multiple component carriers may be aggregated to support the transmission, the aggregation of the component carriers may result in the dedication of excessive bandwidth to the transmission. Alternatively, the component carriers may be sized to have different bandwidths that more closely match the transmission, but the component carriers would then no longer be backwards compatible.

As such, segment carriers have been proposed. A segment carrier is a contiguous bandwidth extension of a backwards compatible component carrier. Thus, in the instance in which the bandwidth required for transmission is slightly larger than the bandwidth of a backwards compatible component carrier, the transmission may be supported by a combination of the backwards compatible component carrier and a segment carrier that is appended to and contiguous with the component carrier from a bandwidth perspective. As such, segment carriers provide for efficient transmission even in instances in which the bandwidth required for transmission differs from the bandwidth of the backwards compatible component carriers, while permitting the component carriers to remain backwards compatible. Moreover, segment carriers may provide for efficient signal transmission in that a segment carrier and the backwards compatible component carrier from which the segment carrier extends share a single physical downlink control channel (PDCCH) for resource allocation and a signal hybrid authorization request (HARQ) for the combined bandwidth.

However, SRS has not been provided for segment carriers. Since the bandwidth of a segment carrier may be significant and/or since the channel fading characteristics may be quite different for a frequency selective channel even when spaced a few PRBs away from the component carrier, it may be advisable to also provide SRS for a segment carrier.

SUMMARY OF THE INVENTION

A method, apparatus and computer program product are therefore provided in order to configure the SRS for a segment carrier. As such, the SRS for a segment carrier may be configured to be different than the SRS for the associated component carrier. Based upon the configuration of the SRS of the segment carrier, the SRS may be transmitted from the mobile terminal to a base station to facilitate estimation of the quality of the uplink channel.

In one embodiment, a method is provided that includes receiving a triggering message that identifies respective configurations of a sounding reference signal (SRS) for a component carrier and an associated segment carrier. The configuration of the SRS for the component carrier is different than the configuration of the SRS for the segment carrier. The method also causes the SRS to be transmitted in accordance with the respective configurations identified by the triggering message via uplink subframes of the component carrier and the segment carrier.

In another embodiment, an apparatus is provided that includes at least one processor and at least one memory including computer program code with the at least one memory and the computer program code being configured to, with the at least one processor, cause the apparatus at least to receive a triggering message that identifies respective configurations of a sounding reference signal (SRS) for a component carrier and an associated segment carrier. The configuration of the SRS for the component carrier is different than the configuration of the SRS for the segment carrier. The at least one memory and the computer program code of one embodiment are also configured to, with the at least one processor, cause the apparatus to causes the SRS to be transmitted in accordance with the respective configurations identified by the triggering message via uplink subframes of the component carrier and the segment carrier.

In a further embodiment, a computer program product is provided that includes at least one computer-readable storage medium having computer-executable program code instructions stored therein with the computer-executable program code instructions including program code instructions for receiving a triggering message that identifies respective configurations of a sounding reference signal (SRS) for a component carrier and an associated segment carrier. The configuration of the SRS for the component carrier is different than the configuration of the SRS for the segment carrier. The computer-executable program code instructions of this embodiment also include program code instructions for causing the SRS to be transmitted in accordance with the respective configurations identified by the triggering message via uplink subframes of the component carrier and the segment carrier.

In yet another embodiment, an apparatus is provided that includes means for receiving a triggering message that identifies respective configurations of a sounding reference signal (SRS) for a component carrier and an associated segment carrier. The configuration of the SRS for the component carrier is different than the configuration of the SRS for the segment carrier. The apparatus of this embodiment also includes means for causing the SRS to be transmitted in accordance with the respective configurations identified by the triggering message via uplink subframes of the component carrier and the segment carrier.

In one embodiment, a method is provided that includes causing transmission of a triggering message that identifies respective configurations of a sounding reference signal (SRS) for a component carrier and an associated segment carrier. The configuration of the SRS for the component carrier is different than the configuration of the SRS for the segment carrier. The method also includes receiving the SRS that is formatted in accordance with the respective configurations identified by the triggering message via uplink subframes of the component carrier and the segment carrier.

In another embodiment, an apparatus is provided that includes at least one processor and at least one memory including computer program code with the at least one memory and the computer program code being configured to, with the at least one processor, cause the apparatus at least to cause transmission of a triggering message that identifies respective configurations of a sounding reference signal (SRS) for a component carrier and an associated segment carrier. The configuration of the SRS for the component carrier is different than the configuration of the SRS for the segment carrier. The at least one memory and the computer program code of one embodiment are also configured to, with the at least one processor, cause the apparatus to receive the SRS that is formatted in accordance with the respective configurations identified by the triggering message via uplink subframes of the component carrier and the segment carrier.

In a further embodiment, a computer program product is provided that includes at least one computer-readable storage medium having computer-executable program code instructions stored therein with the computer-executable program code instructions including program code instructions for causing transmission of a triggering message that identifies respective configurations of a sounding reference signal (SRS) for a component carrier and an associated segment carrier. The configuration of the SRS for the component carrier is different than the configuration of the SRS for the segment carrier. The computer-executable program code instructions may also include program code instructions for receiving the SRS that is formatted in accordance with the respective configurations identified by the triggering message via uplink subframes of the component carrier and the segment carrier.

In yet another embodiment, an apparatus is provided that includes means for causing transmission of a triggering message that identifies respective configurations of a sounding reference signal (SRS) for a component carrier and an associated segment carrier. The configuration of the SRS for the component carrier is different than the configuration of the SRS for the segment carrier. The apparatus of this embodiment also includes means for receiving the SRS that is formatted in accordance with the respective configurations identified by the triggering message via uplink subframes of the component carrier and the segment carrier.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way, it will be appreciated that the scope of the invention encompasses many potential embodiments, some of which will be further described below, in addition to those here summarized.

BRIEF DESCRIPTION OF THE DRAWINGS

Figure 1:
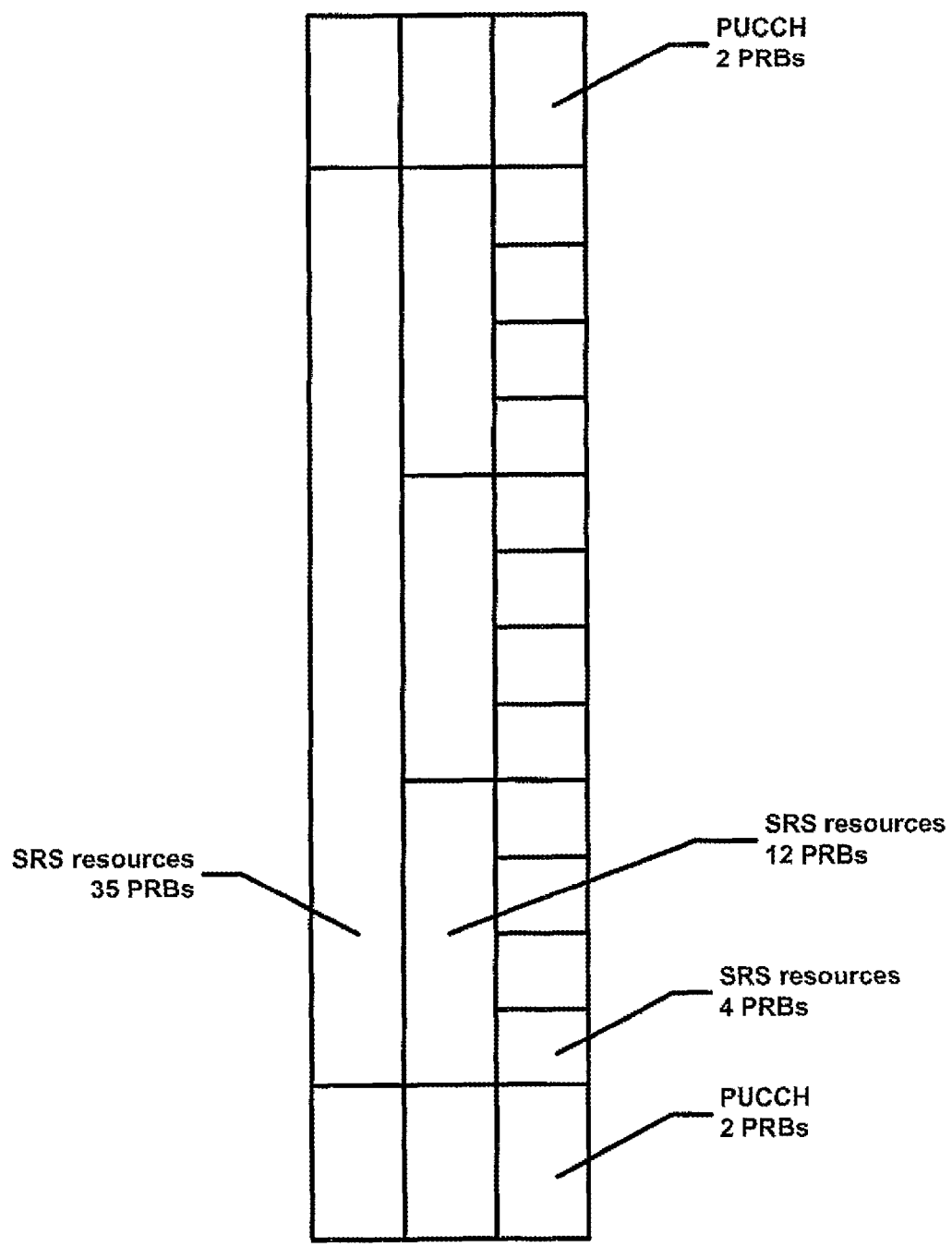
Figure 2:
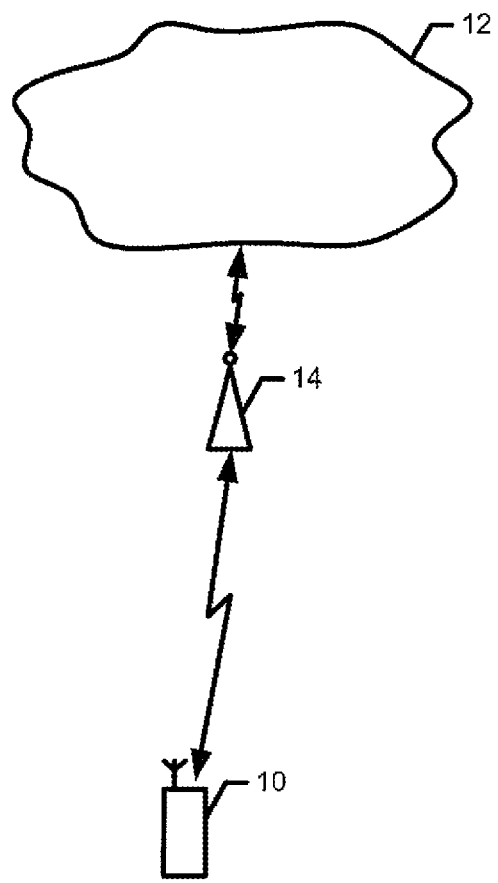
Figure 3:
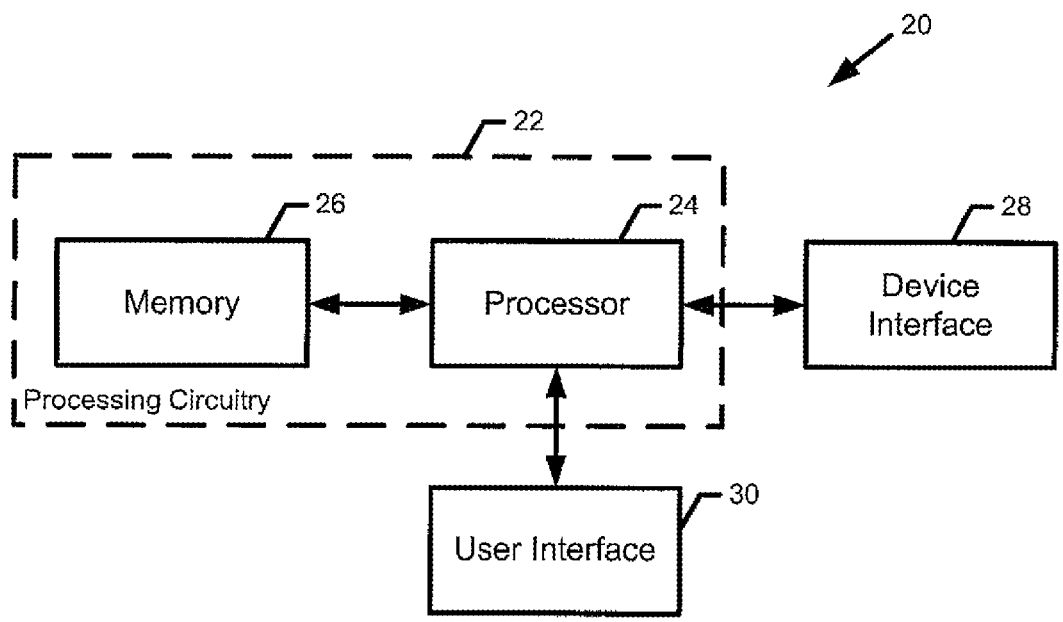
Figure 4:
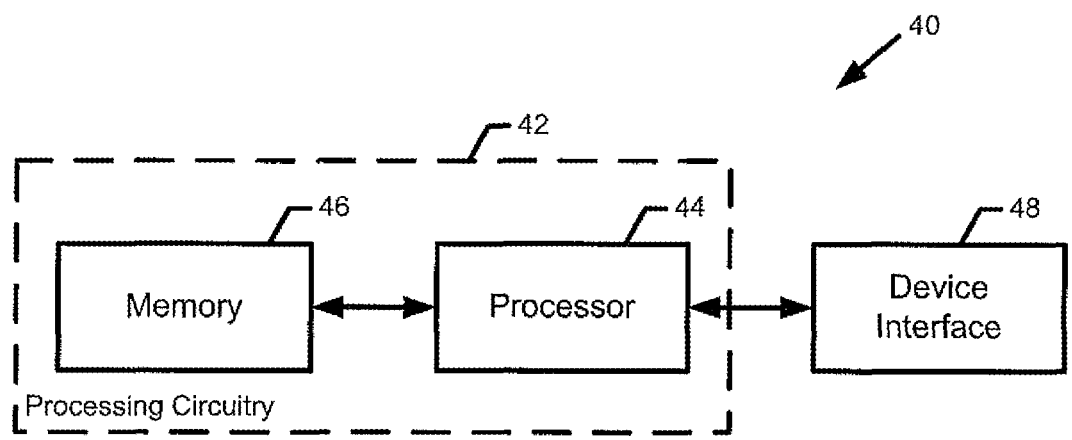
Figure 5:
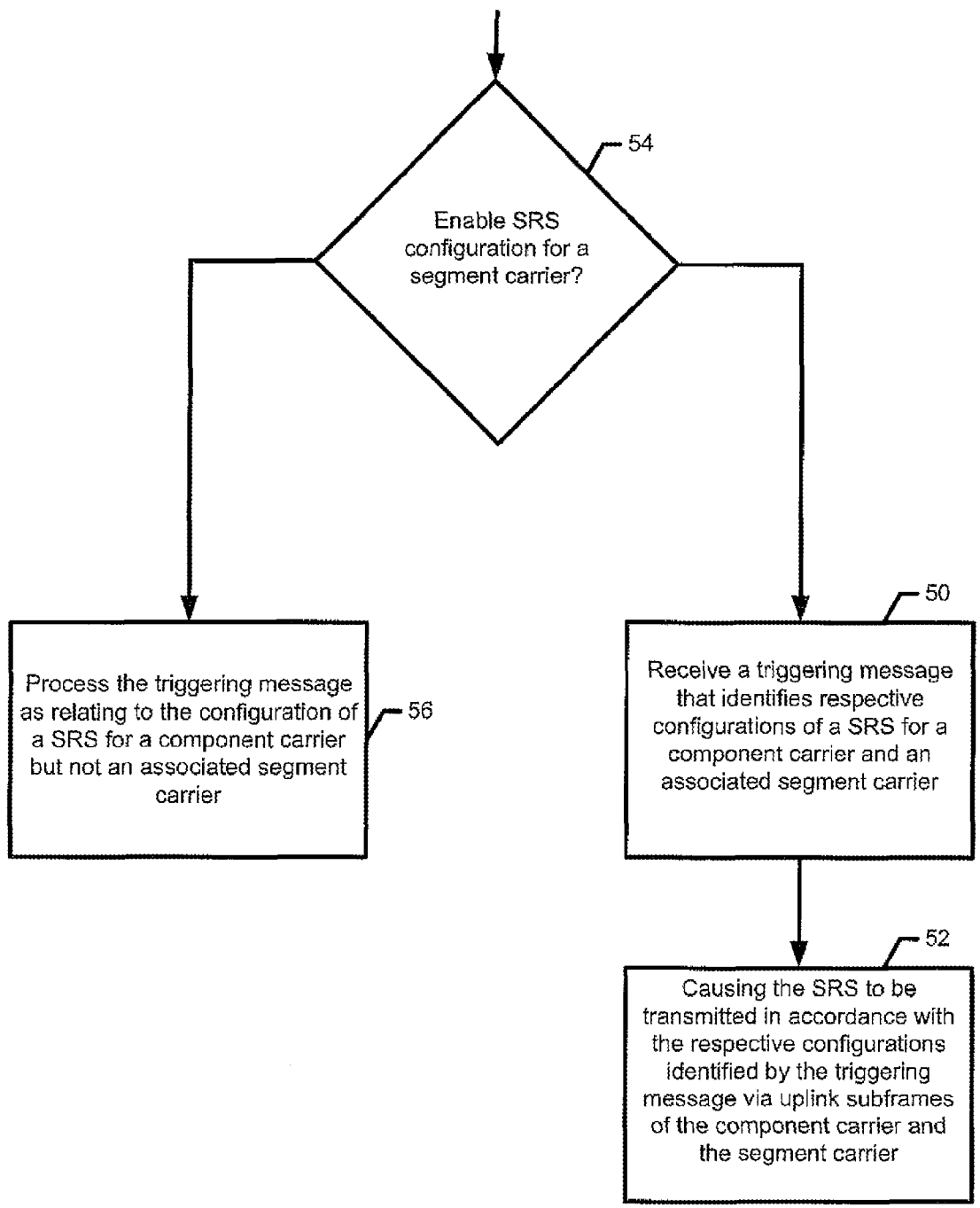
Figure 6:
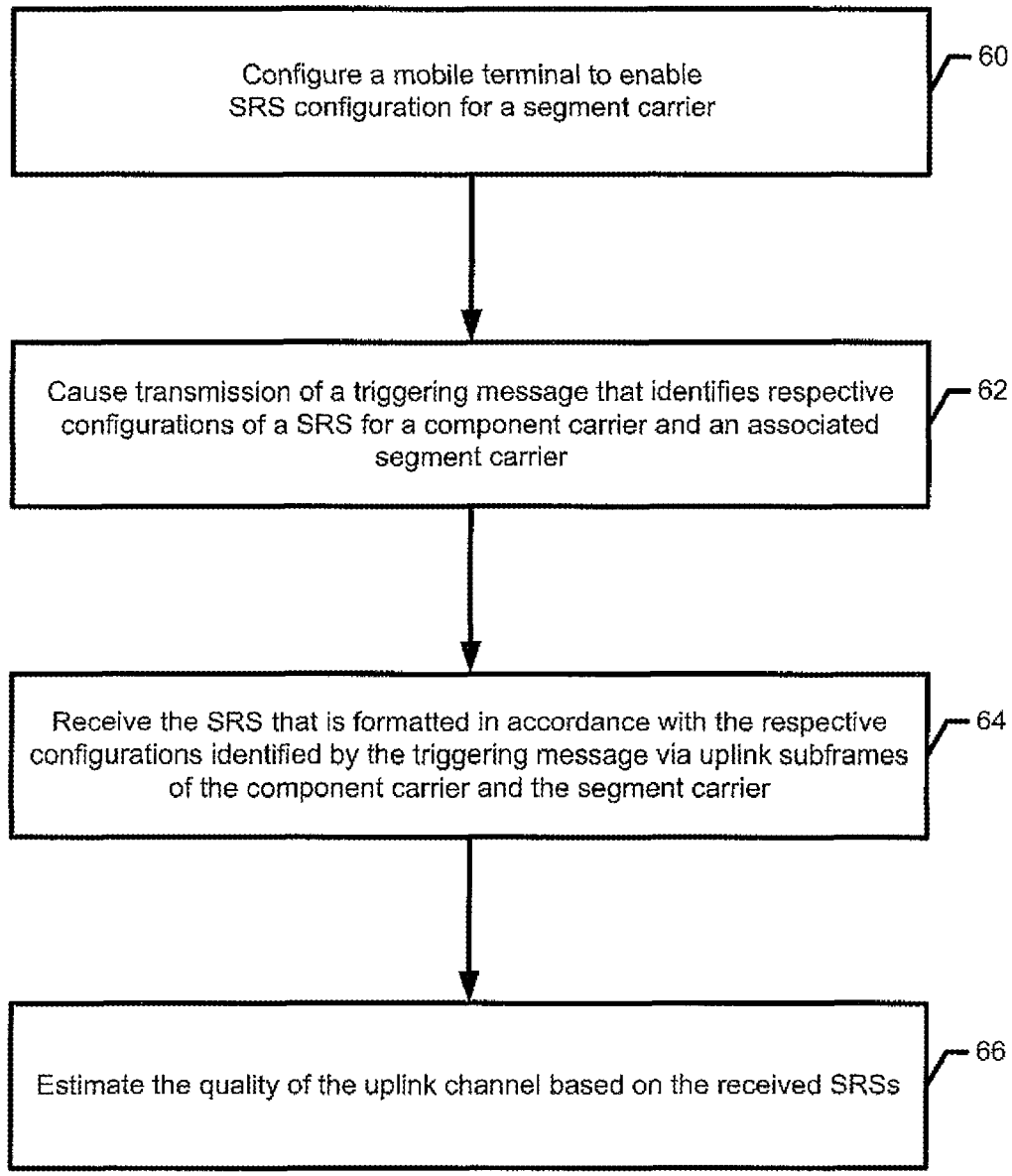

Having thus described example embodiments of the invention in general terms, reference will now be made to the accompanying drawings, which are not necessarily drawn to scale, and wherein:

FIG. 1 illustrates sounding reference signals (SRS) resources in an instance in which the cell specific SRS bandwidth is 36 PRBs;

FIG. 2 illustrates a system including a mobile terminal and a base station configured to support communications in accordance with one embodiment of the present invention;

FIG. 3 is a block diagram of a mobile terminal in accordance with one embodiment of the present invention;

FIG. 4 is a block diagram of a base station or other network element in accordance with one embodiment of the present invention;

FIG. 5 is a flow chart illustrating the operations performed from the perspective of a mobile terminal in accordance with one embodiment of the current invention; and FIG. 6 is a flow chart illustrating the operations performed from the perspective of a base station or other network element in accordance with one embodiment of the current invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a base station and integrated circuit or applications processor integrated circuit for a mobile phone or a similar integrated circuit in server, a cellular network device, or other network device.

A method, apparatus and computer program product are disclosed for configuring a sounding reference signal (SRS) for a segment carrier that serves as a contiguous bandwidth extension of a component carrier, such as a component carrier that is backwards compatible with prior releases of a mobile terminal. Although the method, apparatus and computer program product may be implemented in a variety of different systems, one example of such a system is shown in FIG. 2, which includes a first communication device (e.g., mobile terminal 10) that is capable of communication with a network 12 (e.g., a core network) via a base station 14 (e.g., a Node B, an evolved Node B (eNB) or other type of access point). While the network may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (CPRS) and/or the like.

The network 12 may include a collection of various different nodes, devices or functions that may be in communication with each other via corresponding wired and/or wireless interfaces. For example, the network may include one or more base stations 14, each of which may serve a coverage area divided into one or more cells. The base stations could be, for example, part of one or more cellular or mobile networks or public land mobile networks (PLMNs). In turn, other devices such as processing devices (e.g., personal computers, server computers or the like) may be coupled to the mobile terminal via the network. A communication device, such as the mobile terminal 10 (also known as user equipment (UE)), may be in communication with other communication devices or other devices via the base station 14 and, in turn, the network 12. In some cases, the communication device may include an antenna for transmitting signals to and for receiving signals from a base station.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 12.

In one embodiment, for example, the mobile terminal 10 may be embodied as or otherwise include an apparatus 20 as generically represented by the block diagram of FIG. 3. In the context of a mobile terminal, the apparatus may be configured to define a plurality of resource elements for the provision of channel state information reference signals. While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

The device interface 28 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 12 and/or any other device or module in communication with the processing circuitry 21 In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, a base station 14 or other network entity may be configured to communicate with the mobile terminal 10. In some cases, the base station may include an antenna or an array of antennas for transmitting signals to and for receiving signals from the mobile terminal. The base station may include one or more processors that may define processing circuitry either alone or in combination with one or more memories. The processing circuitry may utilize instructions stored in the memory to cause the base station to operate in a particular way or execute specific functionality when the instructions are executed by the one or more processors. The base station may also include communication circuitry and corresponding hardware/software to enable communication with the mobile terminal and/or the network 12.

In one embodiment, the base station may be embodied as or otherwise include an apparatus 40 as generically represented by the block diagram of FIG. 3. While the apparatus may be employed, for example, by a base station, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 40 may include or otherwise be in communication with processing circuitry 42 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such in some cases, a chip or chipset may constitute means for performing one or more operations for providing the functionalities described herein.

In an example embodiment, the processing circuitry 42 may include a processor 44 and memory 46 that may be in communication with or otherwise control a device interface 48. As such, the processing circuitry may be embodied as a circuit chip (e.g., an integrated circuit chip) configured (e.g., with hardware, software or a combination of hardware and software) to perform operations described herein. However, in some embodiments taken in the context of the base station, the processing circuitry may be embodied as a portion of a base station or other network entity.

The device interface 48 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 12 and/or any other device or module in communication with the processing circuitry 42. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 46 may include one or more non-transitory memory devices such as, for example, volatile and/or non-volatile memory that may be either fixed or removable. The memory may be configured to store information, data, applications, instructions or the like for enabling the apparatus 40 to carry out various functions in accordance with example embodiments of the present invention. For example, the memory could be configured to buffer input data for processing by the processor 44. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 44 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 46 or otherwise accessible to the processor. As such, whether configured by hardware or by a combination of hardware and software, the processor may represent an entity (e.g., physically embodied in circuitry—in the form of processing circuitry 42) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring now to FIGS. 4 and 5, flowcharts illustrating the operations performed by a method, apparatus and computer program product, such as apparatus 20 of FIG. 2 in regards to FIG. 4 and apparatus 40 of FIG. 3 in regards to FIG. 5, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 4 and 5, when executed, convert a computer or processing circuitry into a particular machine configured to perform an example embodiment of the present invention. Accordingly, the operations of each of FIGS. 4 and 5 define an algorithm for configuring a computer or processing circuitry, e.g., processor 24 or processor 44, to perform an example embodiment. In some cases, a general purpose computer may be provided with an instance of the processor which performs the algorithm of a respective one of FIGS. 4 and 5 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In the context of a mobile terminal 10 and according to embodiments of the present invention, the apparatus 20 may include means, such as the processing circuitry 22, the processor 24, the device interface 28 or the like, for receiving a triggering message that identifies respective configurations of a SRS for a component carrier and an associated segment carrier. See operation 50 of FIG. 5. In this regard, the segment carrier is a contiguous bandwidth extension of a component carrier which, in one embodiment, may be a backwards compatible component carrier having a bandwidth equal to that of a component carrier of a legacy system, such as a prior release or version of, for example, LTE. The triggering message may be provided in various manners. In one embodiment, however, the triggering message is provided via PDCCH signaling, such as via one or more predefined bits, e.g., 2 predefined bits, of the PDCCH signaling.

The configuration of the SRS for the component carrier is different than the configuration of the SRS for the segment carrier. In this regard, the configuration of the SRS is defined by a plurality of parameters. As such, at least some of the parameters that define the SRS for the component carrier are different than the corresponding parameters of the SRS for the segment carrier. However, at least some of the parameters that define the SRS of the segment carrier may be identical to the corresponding parameter(s) that define the SRS for the component carrier. By maintaining some of the parameters of the SRS in common between the segment carrier and the component carrier, the signaling associated with the configuration of the SRS for the segment carrier may be reduced by relying upon at least some of the parameters defined by the SRS for the associated component carrier. By way of example, the sequence cyclic shift and transmission comb parameters may be identical for both the SRS for the segment carrier and the SRS for the component carrier and may be selected so as to provide sufficient multiplexing capacity. Indeed, the sequence cyclic shift and the transmission comb may be configured by the mobile terminal 10 in accordance with a higher layer, such as based upon predefined values for the respective parameters. Additionally or alternatively, one or more of the mobile terminal specific parameters, such as the sequence group number and/or the base sequence number, may be identical for both the SRS for the segment carrier and the SRS for the component carrier. In order to reduce the signaling associated with the configuration of the SRS for the segment carrier, the configuration of the SRS for the segment carrier may include, in one embodiment, a parameter defining the SRS bandwidth with the SRS bandwidth equaling the bandwidth of the segment carrier.

In one embodiment, a component carrier may have two or more segment carriers associated therewith as contiguous bandwidth extensions of the component carrier. In this embodiment, each segment carrier may be separately identified by the triggering message. For example, each segment carrier may have a unique index. As such, the triggering message of this embodiment may include the index of a respective segment carrier in order to indicate that the configuration of the SRS defined by the triggering message is for the segment carrier having the respective index. In an alternative embodiment, the segment index may be signaled independently of the triggering message. Regardless of the manner in which the segment index is signaled, the parameters that define the configuration of the SRS for the segment carriers may be identical for each segment carrier or at least some of the parameters that define the configuration of the SRS for the segment carriers may be different from one another.

In one embodiment, the triggering message may include a predefined number of bits, such as 2 bits, having a plurality of predetermined states, such as in accordance with a Downlink Control Information (DCI) format, such as described by 3GPP TS 36.211, v9.0.0, section 5.3.3. In the embodiment in which a triggering message includes 2 bits, four distinct states may be defined. Each state may be associated with a predefined configuration of the SRS for the component carrier and a predefined, albeit different, configuration of the SRS for the segment carrier. In this regard, the apparatus 20 may include means, such as the memory 26 or the like, for storing data that defines the various configurations of the SRS for the component carrier and the various configurations of the SRS for the segment carrier and that associates each configuration with a respective state as defined by the triggering message. By way of example, Table 1 is provided below and illustrates the configuration of the SRS for a backwards compatible component carrier and the configuration of the SRS for the associated segment carrier for each of four different states as defined by a triggering message received by the apparatus 20, such as the mobile terminal 10.

| | Backward compatible Component Carrier | | | Segment Carrier | |
|---|---|---|---|---|---|
| | Frequency | | | | |
| State | SRS Bandwidth | Domain Position | Other parameters | Segment index | Other parameters |
| 1 | B1 | F1 | O1 | N1 | T1 |
| 2 | B2 | F2 | O2 | N2 | T2 |
| 3 | B3 | F3 | O3 | No activation | |
| 4 | No activation | | | No activation | |

For each state, the configuration of the SRS for the component carrier of this embodiment includes the SRS bandwidth, the frequency domain position and any other parameters, while the configuration of the SRS for the segment carrier includes the segment index (in an instance in which the component carrier is potentially associated with multiple segment carriers) and other possible parameters, such as SRS sequence parameters that are different than the corresponding parameters for the component carrier and/or SRS sequence parameters for which corresponding parameters are not available for the component carrier. While Table 1 illustrates that certain states may not activate the segment carrier (see, for example, state 3) or do not activate both the component carrier and the segment carrier (see, for example, state 4), other embodiments of the method, apparatus and computer program product may activate the SRS for the component carrier and/or the SRS for the segment carrier in a different number of states, such as all or an increased number of the states or in a fewer number of the states. In one embodiment, for example, the SRS for the segment carrier may be activated in one or more states in which the SRS for the associated component carrier is not activated.

As shown in operation 52 of FIG. 5, the apparatus 20 may include means, such as the processing circuitry 22, the processor 24, the device interface 28 or the like, for causing the SRS to be transmitted in accordance with the respective configurations identified by the triggering message. In this regard, the SRS for the component carrier may be transmitted via an uplink subframe of the component carrier and the SRS for the segment carrier may be transmitted via an uplink subframe of the segment carrier, in one embodiment, any collision between the SRS subframe for the segment carrier and the SRS subframe for the component carrier may be resolved in a predefined manner, such as by providing for transmission of only the SRS subframe for the segment carrier.

In one embodiment, the apparatus 20, such as the mobile terminal 10, may be selectively configured to allow for the separate configuration of the SRS of the segment carrier in the mariner described above, that is, to allow for the configuration of the SRS of the segment carrier in a manner that differs, at least for some parameters, than the SRS of the associated component carrier. As shown by optional operation 54 of FIG. 5, the apparatus 20 may include means, such as the processing circuitry 22, the processor 24 or the like, for determining whether separate configuration of the SRS for the segment carrier has been enabled. In this regard, the apparatus, such as the processing circuitry, the processor, the device interface 28 or the like, may receive a signal from the network, such as from the base station 14, that identifies whether separate configuration of the SRS for the segment carrier is to be enabled or not. In an instance in which the separate configuration of the SRS for the segment carrier is enabled, the apparatus may proceed as described above in conjunction with, for example, operations 50 and 52 of FIG. 5. However, in an instance in which the apparatus, such as a mobile terminal 10, is not configured for the separate configuration of the SRS for the segment carrier, the apparatus 20 may include means, such as the processing circuitry, the processor, the device interface or the like, for processing any subsequent SRS triggering messages in accordance with the procedures of a legacy system, such as a prior version or revision of LTE. As such, any subsequent SRS triggering messages may be processed so as to extract the configuration of the SRS for the component carrier without any separate configuration of the SRS for the associated segment carrier.

In a comparable manner as described above in conjunction with the apparatus 20 that may be embodied as or otherwise include a portion of the mobile terminal 10, the apparatus 40 that is embodied as or may otherwise include a portion of the base station 14 or other network entity may operate in a comparable manner so as to configure the SRS of the segment carrier. As shown in operation 60 of FIG. 6, the apparatus 40 may include means, such as processing circuitry 42, the processor 44 or the like, for configuring the mobile terminal to enable the separate configuration of the SRS for a segment carrier relative to the configuration of the SRS for an associated component carrier. In an instance in which the configuration of the SRS for the segment carrier is not to be separate from the configuration of the SRS for the associated component carrier or in an instance in which the segment carrier will not have an SRS, the apparatus 40, such as the processing circuitry, the processor, the device interface 48 or the like, may advise the mobile terminal such that any subsequent SRS triggering signals are processed by the mobile terminal and responded thereto in accordance with SRS triggering signals of a legacy system, such as a prior version or release of LTE, e.g., LTE release 8 or 9.

However, in an instance in which the apparatus 40 does configure the mobile terminal 10 to enable separate configuration of the SRS of the segment carrier, the apparatus may also include means, such as a processing circuitry 42, the processor 44, the device interface 48 or the like, for causing transmission of a triggering message to the mobile terminal that defines the separate configuration of the SRS for the segment carrier. In this regard, as shown in operation 62 of FIG. 6, the apparatus 40 also includes means, such as the processing circuitry, the processor, the device interface or the like, for causing transmission of a triggering message that identifies the respective configurations of the SRS for a component carrier and an associated segment carrier. As described above in conjunction with operation 50 of FIG. 5, the configuration of the SRS for the component carrier is different than the configuration of the SRS for the segment carrier. As also described above, the SRS for the segment carrier may separately identify each of a plurality of segment carriers in an instance in which a plurality of segment carriers are associated with the component carrier. Additionally, the configuration of the SRS for the segment carrier may include a plurality of parameters, one or more of which may be different than the corresponding parameters of the configuration of the SRS for the component carrier and one or more of which may be identical to the corresponding parameters defined by the configuration of the SRS for the component carrier. For example, the configuration of the SRS for the segment carrier may include parameters defining a sequence cyclic shift and a transmission comb and, in one embodiment, a sequence group number and/or a base sequence number, that are identical to the corresponding parameters defined by the configuration of the SRS for the component carrier. As noted above, the configuration of the SRS for the segment carrier may include, in one embodiment, a parameter defining the SRS bandwidth with the SRS bandwidth equaling a bandwidth of the segment carrier.

The apparatus 40 may also include means, such as the processing circuitry 42, the processor 44, the device interface 48 or the like, for receiving the SRS from the mobile terminal 10 that is formatted in accordance with the respective configurations identified by the triggering message. See operation 64 of FIG. 6. In this regard, the apparatus 40 may receive the SRS for the component carrier via an uplink subframe of the component carrier and may receive the SRS for the segment carrier via an uplink subframe for the segment carrier. Based upon the SRSs of the component carrier and the segment carrier, the apparatus 40 may include means, such as a processing circuitry, the processor or the like, for estimating the quality of the respective uplink channels. See operation 66 of FIG. 6. Based upon these estimates, the base station 14 or other network entity may assign channels for subsequent transmissions in a more effective manner, such as by providing for the assignment of channels of a higher quality.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving a triggering message that identifies respective configurations of a sounding reference signal (SRS) for a component carrier and an associated segment carrier, wherein the configuration of the SRS for the component carrier is different than the configuration of the SRS for the segment carrier; and
causing the SRS to be transmitted in accordance with the respective configurations identified by the triggering message via uplink subframes of the component carrier and the segment carrier, wherein at least one of:
receiving the triggering message comprises receiving the triggering message that separately identifies each of a plurality of segment carriers associated with the component carrier,
the configuration of the SRS for the segment carrier includes one or more different parameters than the configuration of the SRS for the component carrier,
the configuration of the SRS for the segment carrier includes at least one parameter that is identical to a corresponding parameter defined by the configuration of the SRS for the component carrier,
the configuration of the SRS for the segment carrier includes parameters defining a sequence cyclic shift and transmission comb that are identical to the sequence cyclic shift and the transmission comb, respectively, defined by the configuration of the SRS for the component carrier, and
the configuration of the SRS for segment carrier includes a parameter defining an SRS bandwidth, and wherein the SRS bandwidth equals a bandwidth of the segment carrier.

2. The method according to claim 1, wherein the triggering message is received via a PDCCH signaling.

3. The method according to claim 1, wherein the triggering message comprises a predefined number of bits, having a plurality of predetermined states.

4. The method according to claim 3, wherein each of the plurality of predetermined states is associated with a first predefined configuration of the SRS for the component carrier and a second predefined configuration of the SRS for the segment carrier, the first predefined configuration is different from the second predefined configuration.

5. The method according to claim 1, wherein the parameters of the configuration of the SRS for the segment carrier include at least one of SRS bandwidth or frequency domain position, and wherein the parameter of the configuration of the SRS for the component carrier include at least one of segment index or SRS sequence parameters.

6. The method according to claim 1, wherein the component carrier comprises two or more segment carriers associated therewith as contiguous bandwidth extensions of the component carrier.

7. An apparatus comprising:
at least one processor; and
at least one memory including computer program code, wherein the at least one memory and the computer program code are configured to, with the at least one processor, cause the apparatus at least to perform:
receiving a triggering message that identifies respective configurations of a sounding reference signal (SRS) for a component carrier and an associated segment carrier, wherein the configuration of the SRS for the component carrier is different than the configuration of the SRS for the segment carrier; and
causing the SRS to be transmitted in accordance with the respective configurations identified by the triggering message via uplink subframes of the component carrier and the segment carrier, wherein at least one of:
the at least one memory and the computer program code are configured to, with the at least one processor, cause the apparatus to receive the triggering message by receiving the triggering message that separately identifies each of a plurality of segment carriers associated with the component carrier,
the configuration of the SRS for the segment carrier includes one or more different parameters than the configuration of the SRS for the component carrier,
the configuration of the SRS for the segment carrier includes at least one parameter that is identical to a corresponding parameter defined by the configuration of the SRS for the component carrier,
the configuration of the SRS for the segment carrier includes parameters defining a sequence cyclic shift and transmission comb that are identical to the sequence cyclic shift and the transmission comb, respectively, defined by the configuration of the SRS for the component carrier,
the configuration of the SRS for segment carrier includes a parameter defining an SRS bandwidth, and wherein the SRS bandwidth equals a bandwidth of the segment carrier,
the apparatus comprises a mobile terminal,
further comprising a device interface configured to communicate with a base station in order to receive the triggering message that identifies respective configurations of the SRS for the component carrier and the associated segment carrier, and
the processor is configured for use in a Long Term Evolution (LTE) system.

8. The apparatus according to claim 7, wherein the triggering message is received via a PDCCH signaling.

9. The apparatus according to claim 7, wherein the triggering message comprises a predefined number of bits, having a plurality of predetermined states.

10. The apparatus according to claim 9, wherein each of the plurality of predetermined states is associated with a first predefined configuration of the SRS for the component carrier and a second predefined configuration of the SRS for the segment carrier, the first predefined configuration is different from the second predefined configuration.

11. The apparatus according to claim 7, wherein the parameters of the configuration of the SRS for the segment carrier include at least one of SRS bandwidth or frequency domain position, and wherein the parameter of the configuration of the SRS for the component carrier include at least one of segment index or SRS sequence parameters.

12. The apparatus according to claim 7, wherein the component carrier comprises two or more segment carriers associated therewith as contiguous bandwidth extensions of the component carrier.

13. A method comprising:
causing transmission of a triggering message that identifies respective configurations of a sounding reference signal (SRS) for a component carrier and an associated segment carrier, wherein the configuration of the SRS for the component carrier is different than the configuration of the SRS for the segment carrier; and
receiving the SRS that is formatted in accordance with the respective configurations identified by the triggering message via uplink subframes of the component carrier and the segment carrier wherein at least one of:
causing transmission of the triggering message comprises causing transmission of the triggering message that separately identifies each of a plurality of segment carriers associated with the component carrier,
the configuration of the SRS for the segment carrier includes one or more different parameters than the configuration of the SRS for the component carrier,
the configuration of the SRS for the segment carrier includes at least one parameter that is identical to a corresponding parameter defined by the configuration of the SRS for the component carrier, the configuration of the SRS for the segment carrier includes parameters defining a sequence cyclic shift and transmission comb that are identical to the sequence cyclic shift and the transmission comb, respectively, defined by the configuration of the SRS for the component carrier, and the configuration of the SRS for segment carrier includes a parameter defining an SRS bandwidth, and wherein the SRS bandwidth equals a bandwidth of the segment carrier.

14. The method according to claim 13, wherein the triggering message is received via a PDCCH signaling.

15. The method according to claim 13, wherein the triggering message comprises a predefined number of bits, having a plurality of predetermined states.

16. The method according to claim 15, wherein each of the plurality of predetermined states is associated with a first predefined configuration of the SRS for the component carrier and a second predefined configuration of the SRS for the segment carrier, the first predefined configuration is different from the second predefined configuration.

17. The method according to claim 13, wherein the parameters of the configuration of the SRS for the segment carrier include at least one of SRS bandwidth or frequency domain position, and wherein the parameter of the configuration of the SRS for the component carrier include at least one of segment index or SRS sequence parameters.

18. The method according to claim 13, wherein the component carrier comprises two or more segment carriers associated therewith as contiguous bandwidth extensions of the component carrier.

19. An apparatus comprising:
at least one processor; and
at least one memory including computer program code, wherein the at least one memory and the computer program code are configured to, with the at least one processor, cause the apparatus at least to perform:
causing transmission of a triggering message that identifies respective configurations of a sounding reference signal (SRS) for a component carrier and an associated segment carrier, wherein the configuration of the SRS for the component carrier is different than the configuration for the SRS for the segment carrier; and
receiving the SRS that is formatted in accordance with the respective configurations identified by the triggering message via uplink subframes of the component carrier and the segment carrier, wherein at least one of:

the at least one memory and the computer program code are configured to, with the at least one processor, cause the apparatus to cause transmission of the triggering message by causing transmission of the triggering message that separately identifies each of a plurality of segment carriers associated with the component carrier, the configuration of the SRS for the segment carrier includes one or more different parameters than the configuration of the SRS for the component carrier, the configuration of the SRS for the segment carrier includes at least one parameter that is identical to a corresponding parameter defined by the configuration of the SRS for the component carrier, the configuration of the SRS for the segment carrier includes parameters defining a sequence cyclic shift and transmission comb that are identical to the sequence cyclic shift and the transmission comb, respectively, defined by the configuration of the SRS for the component carrier the configuration of the SRS for segment carrier includes a parameter defining an SRS bandwidth, and wherein the SRS bandwidth equals a bandwidth of the segment carrier, the apparatus comprises a mobile terminal, further comprising a device interface configured to communicate with a mobile terminal in order to cause transmission of the triggering message that identifies respective configurations of the SRS for the component carrier and the associated segment carrier, and the processor is configured for use in a Long Term Evolution (LTE) system.

20. The apparatus according to claim 19, wherein the triggering message is transmitted via a PDCCH signaling.

* * * * *